(12) United States Patent
Van Der Spek

(10) Patent No.: US 7,315,666 B2
(45) Date of Patent: Jan. 1, 2008

(54) COILED OPTICAL FIBER ASSEMBLY FOR MEASURING PRESSURE AND/OR OTHER PHYSICAL DATA

(75) Inventor: Alexander Michael Van Der Spek, GS Rijswijk (NL)

(73) Assignee: Shell Oil Company, Houston, TX (US)

( * ) Notice: Subject to any disclaimer, the term of this patent is extended or adjusted under 35 U.S.C. 154(b) by 177 days.

(21) Appl. No.: 10/548,161

(22) PCT Filed: Mar. 4, 2004

(86) PCT No.: PCT/EP2004/050249

§ 371 (c)(1),
(2), (4) Date: Sep. 6, 2005

(87) PCT Pub. No.: WO2004/081509

PCT Pub. Date: Sep. 23, 2004

(65) Prior Publication Data

US 2006/0071158 A1    Apr. 6, 2006

(30) Foreign Application Priority Data

Mar. 5, 2003    (EP) .................................. 03075647

(51) Int. Cl.
G02B 6/00 (2006.01)
(52) U.S. Cl. .......................................... 385/12; 385/13
(58) Field of Classification Search .................. 385/12, 385/13
See application file for complete search history.

(56) References Cited

U.S. PATENT DOCUMENTS

| | | | | |
|---|---|---|---|---|
| RE34,732 E | * | 9/1994 | Iri et al. ...................... | 385/109 |
| 5,765,948 A | | 6/1998 | Sai ............................. | 374/161 |
| 5,825,804 A | | 10/1998 | Sai ............................. | 374/137 |
| 5,845,033 A | | 12/1998 | Berthold et al. .............. | 385/12 |
| 6,004,639 A | * | 12/1999 | Quigley et al. ............. | 428/36.3 |

(Continued)

FOREIGN PATENT DOCUMENTS

EP    0377549    7/1990

(Continued)

*Primary Examiner*—Kevin S Wood
*Assistant Examiner*—John M Bedtelyon

(57) ABSTRACT

A method and system are disclosed for measuring pressure and other physical data, such as the temperature, elongation, torsion and bending at any point along the length of an elongate carrier tube by means of one or more coiled optical fibers that are embedded in the wall the tube such that deformation of the carrier tube induces strain in each optical fiber. In use a pulsed laser light source transmits a sequence of light pulses of a selected wavelength from an upstream end of each fiber into a coiled substantially uniform light guide channel provided by the optical fiber and a light sensor assembly detects any shift in wavelength of the light pulses backscattered from various locations along the length of the light guide channel. A signal processing assembly then calculates a strain pattern along the length of the fiber, and a pressure difference between the interior and exterior of the tube, at various locations along the length of the carrier tube. Preferably several fibers are wound at different pitch angles and in different directions and at different diameters in the wall of the carrier tube and the signal processing assembly calculates bending, torsion and both radial and axial deformation of the carrier tube on the basis of a comparison of the strain patterns induced on different optical fibers.

19 Claims, 2 Drawing Sheets

U.S. PATENT DOCUMENTS 6,233,374 B1    5/2001    Ogle et al. .................... 385/13

FOREIGN PATENT DOCUMENTS

| GB | 2303445 | 2/1997 |
|----|---------|--------|
| JP | 60219503 | 11/1985 |
| JP | 6043056 | 2/1994 |
| JP | 6148017 | 5/1994 |
| JP | 9026370 | 1/1997 |
| JP | 2000-18981 | 1/2000 |
| WO | 98/27406 | 6/1998 |
| WO | 01/07935 | 2/2001 |

\* cited by examiner

COILED OPTICAL FIBER ASSEMBLY FOR MEASURING PRESSURE AND/OR OTHER PHYSICAL DATA

The present application claims priority on European Patent Application 03075647.2 filed Mar. 5, 2003.

FIELD OF THE INVENTION

The invention relates to a method and system for measuring data by means of one or more optical fibers.

BACKGROUND OF THE INVENTION

The invention relates to a method and system for measuring pressure and/or other physical data, such as temperature and deformation due to axial, torque and/or bending stresses by means of one or more optical fibers that are embedded in a deformable carrier tube.

Various fiber optical systems are known for measuring pressure and/or temperature over long distances.

Japanese patent publications JP6043056, JP9026370, JP6148017, JP60219503, JP2000-018981 disclose fiber optical pressure sensor systems, wherein a coiled optical fiber is embedded in a flexible tubular or cylindrical carrier body such that deformation of the carrier body will cause variation of the curvature and shape of the coiled optical fiber. This deformation initiates variation of transmission losses in optical signals transmitted from one end towards another end of the coiled fiber. These known systems are configured to detect an average pressure exerted on the carrier body and are not designed for use as Distributed Pressure Sensors (DPS) which detect the pressure exerted at different locations along the length of the carrier body and map pressure variations along the length of the carrier body.

U.S. Pat. Nos. 5,845,033 and 6,233,374 and International patent applications WO 00/00799 and WO 01/07935 disclose coiled optical fibers inscribed by Fiber Bragg gratings for detecting pressure exerted to a carrier tube in which the coiled optical fibers are embedded. A Fiber Bragg grating is formed by a pair of axially displaced disruptions in the fiber, which will reflect a narrow band of light at a specific wavelength. Variation of the spacing between a pair of such disruptions, for example due to strain induced by pressure and/or temperature, will cause a shift in the wavelength of the light it reflects. Thus a detected shift in wavelength reflected by a Fiber Bragg grating can be correlated to an elongation or shortening of the length of the optical fiber between a pair of the disruptions that form the grating. Various Fiber Bragg gratings may be distributed along the length of an optical fiber and the signals reflected by these grating may be multiplexed and distinguished from each other by known interferometric signal distinguishing techniques. Fiber Bragg grating optical sensor systems can be used for distributed pressure measurement along the length of an elongate carrier tube, but the currently available signal distinguishing techniques limit the amount of Fiber Bragg gratings that can be distributed along the length of an optical fiber. Furthermore Fiber Bragg gratings provide fixed sensor sections in an optical fiber, so that pressure and/or other measurements can only be performed in pre-selected section of the fiber, which are subsequently positioned at pre-selected locations where the measurements are to be made.

UK patent application GB2303445 discloses a hydrophone comprising a coiled optical fiber, which is embedded in a flexible conduit that is arranged between two rigid flanges. If an isotropic pressure is applied to the fiber, this causes an anisotropic stress vector in the optical fiber, which may be detected using birefringence in the optical fiber. Thus the known hydrophone is configured to detect variation of the isotropic pressure in the water surrounding the hydrophone and is not suitable for use as a DPS. U.S. Pat. Nos. 5,765,948 and 5,825,804 disclose fiber optical Distributed Temperature Sensor (DTS) systems wherein solely the temperature distribution along the length of an optical fiber is determined on the basis of optical time domain reflectometry, wherein use is made of the Raman spectrum of the backscattered light, which contains temperature information.

European patent application 0377549 discloses a combined DPS and DTS fiber optical system, wherein use is made of a fiber that has a central light guiding region into which interrogating light is launched and a peripheral light guiding region comprising fluorescent material into which a relatively large fraction of light from the central region is deflected under the action of force exerted to the fiber. The light transmitted by the fluorescent material has a unique wavelength, which is different from the wavelength of the interrogating light. By using a pulsed interrogating light source and by measuring the time of flight of the light transmitted by the fluorescent material the location(s) at which force is exerted to the fiber can be detected.

International patent application WO 98/27406 discloses a combined DPS and DTS fiber optical system in which the wavelength of backscattered light is used to measure both temperature and pressure at any point along the length of an optical fiber. The wavelength of the backscattered light changes depending on the strain and temperature at the point from which it is backscattered, which is known as the Brillouin shift. By accurately measuring both the amplitude and the frequency shift of the Brillouin scatter light and comparing it with a reference fiber, both temperature and strain can be measured simultaneously at any point along the length of a conventional optical fiber, which may have a single wave guide channel. There is an opportunity to strengthen the signal response to strain variation so that the strain related backscattered signal has a low sensitivity. The backscattered signal is also influenced by strain induced by torque and or bending forces exerted to the fiber, which decreases the selectivity of the measurement of axial strain variations along the length of the fiber.

SUMMARY OF THE INVENTION

The method according to the invention comprises measuring pressure and/or other physical data by means of a coiled optical fiber, which is embedded in the wall of a carrier tube such that deformation of the carrier tube induces strain in the optical fiber. A pulsed laser light source transmits a sequence of light pulses of a selected wavelength from one end of the fiber into an elongate substantially uniform light guide channel provided by said optical fiber and any shift in wavelength of the light pulses backscattered from various locations along the length of said light guide channel is detected by a light sensor assembly which is located near said end of the fiber. A signal processing assembly calculates a strain pattern along at least a substantial part of the length of the fiber on the basis of the detected wavelength pattern of the backscattered light, and determines on the basis of the calculated strain pattern a pressure difference between the interior and exterior of the carrier tube and/or other physical data at various locations along the length of the carrier tube.

The invention also relates to a fiber optical system for measuring pressure and/or other physical data. The system according to the invention comprises a carrier tube which is in use at least partly surrounded by a first fluid and at least partly filled with a second fluid and at least one optical fiber which is embedded in the wall of the carrier tube such that the optical fiber is coiled along at least a substantial part of the length of the carrier tube and deformation of the carrier tube induces variation of strain in the optical fiber. The system further comprises a pulsed laser light source for transmitting a sequence of light pulses of a selected wavelength from one end of the fiber into an elongate coiled light guide channel provided by said optical fiber, a light sensor assembly located near said end of the optical fiber, which is configured to detect any shift in wavelength of the light pulses backscattered from various locations along the length of said light guide channel, and a signal processing assembly which is designed to calculate a strain pattern along at least a substantial part of the length of the fiber, and on the basis of the calculated strain pattern a pressure difference between said first and second fluid and/or other physical data at a plurality of locations along the length of the carrier tube.

DETAILED DESCRIPTION OF THE INVENTION

Figure 1:
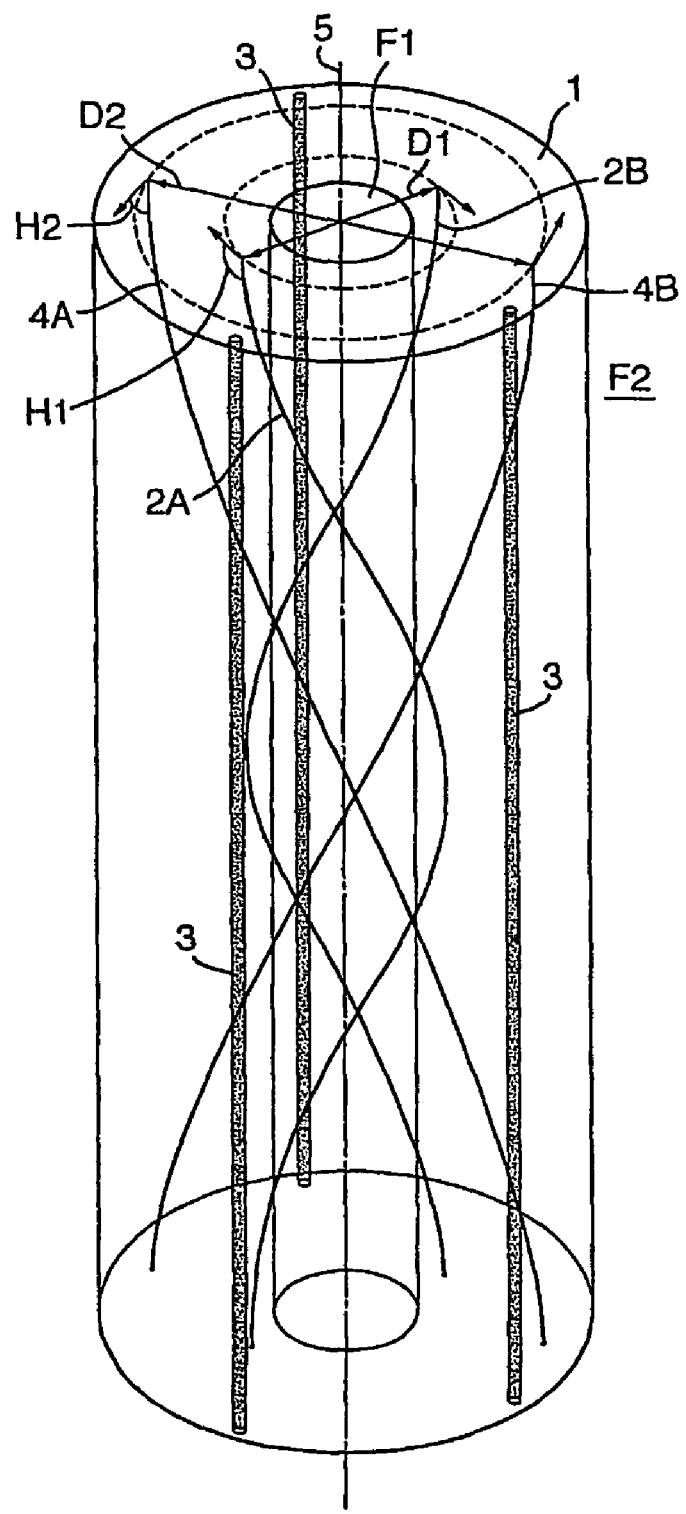
FIG. 1 is a schematic three dimensional view of a carrier tube in which two pairs of optical fibers are embedded at different diameters and such that the fiber pairs have different and opposite pitch angles.
Figure 2:
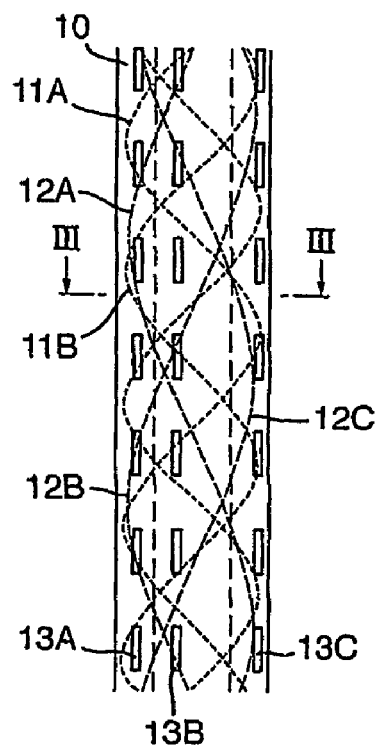
FIG. 2 is a schematic side view of a carrier tube in which two sets of three optical fibers are embedded at different diameters and such that the fiber sets have different and opposite pitch angles.
Figure 3:
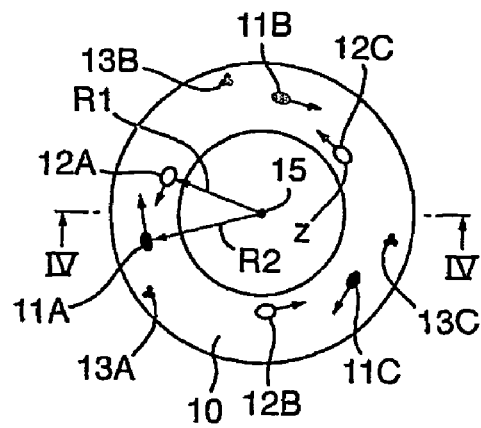
FIG. 3 is a cross-sectional view at an enlarged scale of the carrier tube and optical fiber assembly of FIG. 2 taken across line III-III and seen in the direction of the arrows.
Figure 4:
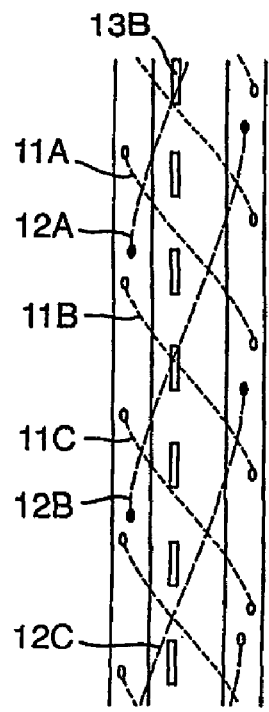
FIG. 4 is a longitudinal sectional view of the carrier tube and optical fiber assembly of FIG. 2 and FIG. 3 taken across line IV-IV in FIG. 3 and seen in the direction of the arrows.
Figure 5:
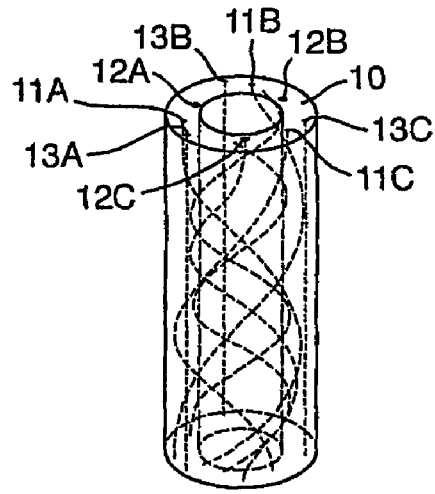
FIG. 5 is a schematic three-dimensional view of the carrier tube and optical fiber assembly of FIGS. 2-4 shown at a smaller scale than in the other Figures.

In FIG. 1 there is shown an elastomeric flexible carrier tube 1 in which three steel longitudinal reinforcement cables 3 and an inner and outer pair of helical optical fibers 2A-2B and 4A-4B are embedded.

The interior of the carrier tube 1 is filled with a first fluid F1 and the tube 1 is surrounded by a second fluid F2 such that a pressure difference between the fluids F1 and F2 generates a circumferential expansion or contraction of the carrier tube 1, whereas the longitudinal reinforcement cables 3 inhibit simultaneous longitudinal elongation or contraction of the carrier tube 1 as a result of said pressure difference and of the weight of the carrier tube 1 and other forces, such as flotation and friction, acting on the carrier tube 1.

The inner pair of optical fibers 2A-2B is wound at a diameter D1 and, when seen from above, in a clockwise direction, relative to a longitudinal axis 5 of the tube 1 and at a first helix angle H1.

The outer pair of optical fibers 4A-4B is wound at a diameter D2 and, when seen from above, in an anti-clockwise direction relative to the longitudinal axis 5 of the tube 1 and at a second helix angle H2.

Through each of the optical fibers 2A-2B and 4A-4B light pulses may be transmitted and the amplitude and frequency shift of the Brillouin backscatter light may be measured and compared with a reference fiber (not shown) to measure both temperature and strain at any point along the length of each of the optical fibers 2A-B and 4A-4B in accordance with the method described in International patent application WO98/27406. The method involves inducing a pulsed laser light source to transmit a sequence of light pulses of a selected wavelength from an upstream end of each fiber 2A-B and 4A-B into the coiled substantially uniform light guide channel provided by each optical fiber and inducing a light sensor assembly to detect any shift in wavelength of the light pulses backscattered from various locations along the length of said light guide channel. A signal processing assembly then calculates a strain pattern along the length of each of the fibers 2A-B and 4A-B.

The carrier tube 1 may be used to measure fluid pressure and temperature in a horizontal inflow region of an oil and/or gas production well, which may be several kilometres long. The carrier tube 1 may be twisted, longitudinally stretched and bent throughout its length and the deformation resulting from these deformation may be determined by comparing the detected strain patterns in the inner and outer pairs of optical fibers 2A-2B and 4A-4B. Thus the effects of torsion, longitudinal strain and bending of the carrier tube 1 on strain in the optical fibers 2A-2B and 4A-4B must be assessed and, if possible, eliminated so that an accurate assessment of the pressure difference between the fluids F1 and F2 in the interior and exterior of the tube 1 can be made on the basis of the strain pattern along the length of the optical fibers 2A-2B and 4A-4B.

The way in which the effects of torsion, longitudinal strain and bending of the carrier tube 1 on the strain patterns in the optical fibers 2A-2B and 4A-4B are assessed and eliminated is described below.

As the diameter D2 is larger than the diameter D1 and the second helix angle H2 is larger than the first helix angle H1 deformation of the carrier tube 1 as a result of longitudinal, tangential and torsional stresses will generate different strain patterns in the inner and outer pairs of optical fibers 2A-2B and 4A-4B.

A positive pressure difference between the fluids F1 and F2 in the interior and exterior of the carrier tube 1 will initiate a tangential expansion of the carrier tube 1 which results in a simultaneous strain increase in both pairs of optical fibers 2A-2B and 4A-4B. The ratio between the resulting strain increase in the inner and outer pairs of optical fibers will be related to the diameter ratio D1/D2 and the helix angle ratio H1/H2. Said ratio between the strain increase in the inner and outer fiber pairs 2A-2B and 4A-4B as a result of a pressure difference between the fluids F1 and F2 in the interior and exterior of the carrier tube 1 may be determined by calculation and laboratory experiments during which said pressure difference is the only parameter that is varied during the experiment.

Torque exerted on the carrier tube 1 in, when seen from above, a clock-wise direction will result in an elongation of the outer pair of optical fibers 4A-4B and in a simultaneous shortening of the inner pair of optical fibers 2A-2B.

The ratio between the negative and positive strain patterns in the inner and outer pairs of optical fibers 2A-2B and 4A-4B as a result of torque exerted on the carrier tube 1 will be related to the diameter ratio D1/D2 and the helix angle ratio H1/H2 and may be determined by calculation and experiments during which torsion of the carrier tube 1 is the only parameter that is varied.

Bending of the carrier tube 1, such that the longitudinal axis 5 is curved, will result in different sinusoidal patterns at which the inner and outer pairs of optical fibers 2A-2B and 4A-4B are elongated and shortened. The difference between said sinusoidal patterns will be related to the diameter ratio D1/D2 and the helix angle ratio H1/H2 and may be determined by calculation and experiments during which the tube 1 is bend in various bending angles and no other parameters are varied during the experiments.

Longitudinal strain of the carrier tube 1 may be caused by gravitation, flotation, friction and the pressure difference between the fluids F1 and F2 in the interior and exterior of the carrier tube 1. Longitudinal strain of the carrier tube 1 will initiate a simultaneous strain of the optical fibers. The ratio between the strain of the inner and outer pairs of optical fibers 2A-2B and 4A-4B resulting from longitudinal strain of the carrier tube 1 may be determined by calculation and experiments during which the longitudinal strain of the carrier tube is varied as the only varying parameter.

The reinforcement cables 3 have a significantly higher stiffness than the elastomeric material of the wall of the tube 1 and therefore inhibit longitudinal deformation of the tube 1 as a result of the pressure difference between the interior and exterior of the tube and flotation, gravity and frictional forces. The longitudinal deformation of the tube may be further increased by embedding more than three reinforcement cables 3 in the wall of the tube 1 and/or by using thicker reinforcement cables 3.

One or more longitudinal optical fibers (not shown) may be arranged parallel to the reinforcement cables 3 to assess the longitudinal strain in the carrier tube 1.

The effects of torsion and bending of the carrier tube on the strain measured in the optical fibers may be determined by comparing the strain levels in the inner and outer pairs of fibers 2A-2B and 4A-4B and by comparing any sinusoidal variations in the strain patterns detected along the length of the fibers 2A-2B and 4A-4B.

FIGS. 2-5 show an alternative embodiment of a carrier tube 10 according to the present invention, wherein two sets of three optical fibers 11A,B and C and 12A,B and C and three longitudinal reinforcement cables 13A, B and C are embedded in the wall of an elastomeric carrier tube 10.

The inner set of three optical fibers 11A,B and C is, when seen from above, wound in anti-clockwise direction at a first helix angle at a first radius R1 relative to a longitudinal axis 15 of the carrier tube 10. The outer set of three optical fibers 12A,B and C is, when seen from above, wound in clockwise direction at a second helix angle at a second radius R2 relative to the longitudinal axis 15 of the carrier tube 10. The first helix angle and first radius R1 are smaller than the second helix angle and second radius R2, respectively.

The strain patterns in the optical fibers 11 and 12 A,B and C may be measured by measuring the amplitude and frequency of the Brillouin shifts of lightpulses that are backscattered at different points of the length of the fibers in the manner described in International patent application WO98/27406. The strain patterns thus detected in the inner and outer sets of optical fibers 11A,B and C and 12A,B and C may be compared and analysed in the same way as described with reference to FIG. 1.

Preferably, the carrier tube has a larger stiffness in a longitudinal direction than in a circumferential direction of the tube. In this way variation of the pressure difference between the first and second fluid will predominantly create circumferential deformation of the carrier tube, whereas simultaneous axial deformation of the tube is inhibited. In such case the carrier tube may be made of a flexible plastic material into which one or more axial reinforcement elements, such as steel cables and/or aramid fibers, are embedded.

Furthermore the interior of the carrier tube may be filled with a fluid, such as a silicone liquid, of which the pressure and density are controlled such that the carrier tube deforms elastically in circumferential direction in response to any variation of the pressure of a fluid surrounding the carrier tube.

It is also preferred that a plurality of optical fibers are embedded in the wall of the carrier tube and are arranged in different substantially helical configurations relative to a longitudinal axis of the tube, and that these fibers are each connected to a common signal processing assembly which compares optical signals reflected along the length of said optical fibers to determine the effects of deformation of the elongate carrier tube resulting from bending and/or torque forces exerted to and/or temperature variations at various locations along the length of the carrier tube.

In such case the carrier tube may comprise at least two helical optical fibers having opposite pitch angles and the signal processing assembly may determine and/or compensate effects of torque on the elongate carrier tube.

If the carrier tube comprises at least two helical optical fibers that are wound substantially co-axially and at different diameters relative to a longitudinal axis of the elongate carrier tube, the signal processing assembly may determine and/or compensate effects of bending of the elongate carrier tube.

If the carrier tube comprises at least two helical optical fibers of which the helixes have substantially different pitch angles, the signal processing assembly may determine and/or compensate effects of elongation of the elongate carrier tube.

In the foregoing embodiments the signal processing assembly may determine fluid pressure exerted to the carrier tube along at least a substantial part of its length by determination of radial compression of the tube and to reduce the effects of torque and/or bending of the tube on said determination.

It is preferred that the signal processing assembly is configured to measure a fluid pressure exerted to and/or the temperature of the carrier tube along at least a substantial part of its length on the basis of a measurement of the shift and area of the Brillouin peaks in optical signals backscattered along the length of the fiber or fibers.

The carrier tube may be arranged along at least part of the length of an inflow region of an oil and/or gas production well and the signal processing assembly may convert the monitored pressure and temperature data into data which indicate the flux and/or composition of well effluents flowing into and/or through the wellbore.

Alternatively, the carrier tube may be arranged alongside at least part of the length of the wellbore of a well outside a well casing and/or outside a perforated liner, which is located in an inflow zone of the well below the well casing. In such case the signal processing assembly may measure fluid pressure in the pores, geological strain and/or deformation in the matrix of the formation surrounding the well casing and/or perforated liner and/or to measure the pressure and temperature of the fluids flowing from the formation into the wellbore surrounding the perforated liner.

It is preferred that the system is a Brillouin back scattering system in which the shift and area of Brillouin peaks in a backscattered pulsed optical signal are indicative of the strain and/or temperature at various locations along the length of at least one optical fiber and the pressure difference between the first and second fluid and the temperature of the wall of the carrier tube at various locations along the length of the tube.

The optical fiber or fibers used in the method and system according to the invention may be conventional optical fibers which each comprise one or more single mode guide channels which are substantially free of Fiber-Bragg gratings.

Further features, advantages and embodiments of the method and system according to the invention will be apparent from the accompanying claims, abstract and detailed description of preferred embodiments with reference to the drawings.

I claim:

1. A method for measuring pressure and other physical data by means of a coiled optical fiber which is embedded in the wall of a carrier tube,
   wherein a pulsed laser light source transmits a sequence of light pulses of a selected wavelength from one end of the fiber into an elongate substantially uniform light guide channel provided by said optical fiber; and
   wherein a light sensor assembly, which is located near said end of the fiber, detects any shift in wavelength of the light pulses backscattered from various locations along the length of said light guide channel and a signal processing assembly calculates on the basis of the detected wavelength pattern of the backscattered light a strain pattern along at least a substantial part of the length of the fiber, and determines on the basis of the calculated strain pattern a pressure difference between the interior and exterior of the carrier tube and other physical data at various locations along the length of the carrier tube;
   wherein a plurality of optical fibers are embedded in the wall of the carrier tube and are arranged in different substantially helical configurations relative to a longitudinal axis of the tube, which fibers are each connected to a common signal processing assembly which compares optical signals reflected along the length of said optical fibers to determine the effects of deformation of the carrier tube resulting from bending and/or torque forces exerted on various locations along the length of the carrier tube and/or temperature variations at various locations along the length of the carrier; and
   wherein said helical configurations are selected from the group consisting of helical fibers having opposite pitch angles, helical fibers which are wound substantially co-axially and at different diameters relative to a longitudinal axis of the carrier tube, helical fibers of which the helixes have substantially different pitch angles, and combinations thereof.

2. The method of claim 1, wherein the carrier tube has a larger stiffness in a longitudinal direction than in a circumferential direction of the tube.

3. The method of claim 1, wherein the carrier tube is made of a flexible plastic material into which are embedded one or more axial reinforcement elements made from a material selected from the group comprising steel cables and aramid fibers.

4. The method of claim 1, wherein the interior of the carrier tube is filled with a fluid of which the pressure is controlled such that the carrier tube deforms elastically in circumferential direction in response to any variation of the pressure of the first fluid.

5. The method of claim 1, wherein the carrier tube comprises at least two helical optical fibers having opposite pitch angles and the signal processing assembly determines and/or compensates for effects of torque on the elongate carrier tube.

6. The method of claim 1, wherein the carrier tube comprises at least two helical optical fibers which are wound substantially co-axially and at different diameters relative to a longitudinal axis of the elongate carrier tube and the signal processing assembly determines and/or compensates for effects of bending of the elongate carrier tube.

7. The method of claim 1, wherein the carrier tube comprises at least two helical optical fibers of which the helixes have substantially different pitch angles and the signal processing assembly determines and/or compensates for effects of elongation of the elongate tube.

8. The method of claim 1, wherein the signal processing assembly determines fluid pressure exerted to the carrier tube along at least a substantial part of its length by determination of radial compression of the tube and removing the effects of torque the effects of torque and bending of the tube from said determined radical compression.

9. A method for measuring pressure and other physical data by means of a coiled optical fibers which is embedded in the wall of a carrier tube,
   wherein a pulsed laser light source transmits a sequence of light pulses of a selected wavelength from one end to the fiber into an elongate substantially uniform light guide channel provided by said optical fiber, and
   wherein a light sensor assembly, which is located near said end of the fiber, detects any shift in wavelength of the light pulses backscattered from various locations along the length of said light guide channel and a signal processing assembly calculates on the basis of the detected wavelength pattern of the backscattered light a strain pattern along the length part of the length of the fiber, and determines on the basis of calculated strain pattern a pressure difference between the interior and the exterior of the carrier tube and other physical data at various locations along the length of the carrier tube,
   wherein the signal processing assembly measures fluid pressure exerted on and/or the temperature of the carrier tube along at least a substantial part of its length on the basis of a measurement of the shift and area of the Brillouin peaks in optical signals backscattered along the length of the fiber or fibers, and
   wherein the carrier tube is arranged along at least part of the length of an inflow region of a production well and the signal processing assembly converts the monitored pressure and/or temperature data into data which indicate the flux and/or composition of well effluents flowing into wellbore and wherein the production of well effluents is controlled in response to said data.

10. A method for measuring pressure and other physical data by means of a coiled optical fiber which is embedded in the wall of the carrier tube,
    wherein a pulsed laser light source transmits a sequence of light pulses of a selected wavelength from one end of the fiber into an elongate substantially uniform light guide channel provided by said optical fiber, and
    wherein a light sensor assembly, which is located near said end of the fiber, detects any shift in wavelength of the light pulses backscattered from various locations along the length of said light guide channel and a signal processing assembly calculates on the basis of the detected wavelength pattern of the backscattered light a strain pattern along at least a substantial part of the length of the fiber, and determines on the basis of the calculated strain pattern a pressure difference between the interior exterior of the carrier tube and the other physical data at various locations along the length of the carrier tube, wherein the signal processing assembly measures fluid pressure exerted on and/or the temperature of the carrier tube along at least a substantial part of its length on the basis of a measurement of the shift and area of the Brillouin peaks in optical signals backscattered along the length of the fiber or fibers, and wherein the carrier tube is arranged alongside at least part of the length of the wellbore of a well outside a tubular in a inflow zone of the well and the signal processing assembly measures fluid pressure in the pores, geological strain and/or deformation in the matrix of the surrounding formation.

11. The method of claim 10, wherein the tubular is a well casing or a well liner.

12. A fiber optical system for measuring pressure and other physical data, the system comprising:
a carrier tube,
at least one optical fiber which is embedded in the wall of the carrier tube such that the optical fiber is coiled along at least a substantial part of the length of the carrier tube and deformation of the carrier tube induces variation of strain in the optical fiber,
a pulsed laser light source for transmitting a sequence of light pulses of a selected wavelength from one end of the fiber into an elongate substantially uniform light guide channel provided by said optical fiber,
a light sensor assembly located near said end of the optical fiber, which is configured to detect any shift in wavelength of the light pulses backscattered from various locations along the length of said light guide channel, and
a signal processing assembly which is designed to calculate on the basis of the wavelength pattern of the backscattered light a strain pattern along at least a substantial part of the length of the fiber, and to determine on the basis of the calculated strain pattern a pressure difference between the interior and exterior of the tube and/or other physical data at a plurality of locations along the length of the carrier tube,
wherein a plurality of optical fibers are embedded in the wall of the carrier tube and are coiled in different helical configurations relative to a longitudinal axis of the carrier tube; and
wherein said helical configurations are selected from the group consisting of helical fibers having opposite pitch angles, helical fibers which are wound substantially co-axially and at different diameters relative to a longitudinal axis of the carrier tube, helical fibers of which the helixes have substantially different pitch angles, and combinations thereof.

13. The fiber optical system of claim 12, wherein at least two of said helical optical fibers have opposite pitch angles relative to the longitudinal axis of the carrier tube and the system is designed to determine effects of torque on the carrier tube at various locations along its length on the basis of differences in strain detected at various locations along the length of the fibers having opposite pitch angles.

14. The fiber optical system of claim 12, wherein at least two helical optical fibers are wound at different diameters relative to the longitudinal axis of the carrier tube and the system is designed to determine bending of the carrier tube at various locations along its length on the basis of differences in strain detected at various locations along the length of the fibers wound at different diameters.

15. The fiber optical system of claim 12, wherein at least two of said helical optical fibers form helixes having substantially different pitch angles relative to the longitudinal axis of the carrier tube and the system is designed to determine elongation of the carrier tube at various locations along its length on the basis of differences in strain detected at various locations along the length of the fibers wound at different pitch angles.

16. The fiber optical system of claim 12, wherein the carrier tube is filled with a fluid and with pressure control means for adjusting the pressure of the fluid.

17. The fiber optical system of claim 12, wherein the system is a distributed pressure and temperature sensing system for sensing pressure and/or temperature in a fluid surrounding the carrier tube at various locations along the length of the carrier tube.

18. The fiber optical system of claim 12, wherein the system is a Brillouin back scattering system in which the Brillouin peaks in a backscattered pulsed optical signal are indicative of the strain and temperature at various locations along the length of at least one optical fiber and the pressure difference between the interior and exterior of the carrier tube at various locations along the length of the tube.

19. The fiber optical system of claim 12, wherein each of the optical fibers comprises one or more single mode wave guide channels which are substantially free of Fibre-Bragg gratings and fluorescent reflecting materials.

* * * * *